(No Model.) 2 Sheets—Sheet 1.

L. KATZENSTEIN.
METALLIC RING PACKING.

No. 595,811. Patented Dec. 21, 1897.

WITNESSES:
Gustave Dieterich
Geo. E. Morse

INVENTOR
Leopold Katzenstein,
BY Briesen & Knauth
ATTORNEYS

THE NORRIS PETERS CO., PHOTO-LITHO., WASHINGTON, D. C.

(No Model.) 2 Sheets—Sheet 2.
L. KATZENSTEIN.
METALLIC RING PACKING.
No. 595,811. Patented Dec. 21, 1897.
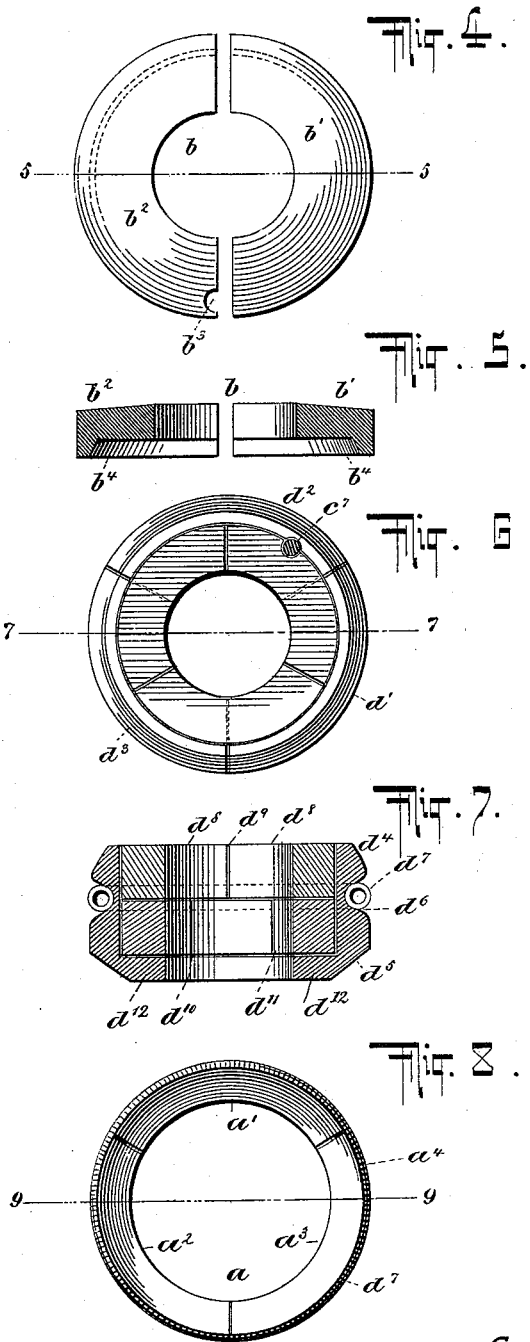
WITNESSES:
INVENTOR
Leopold Katzenstein
BY 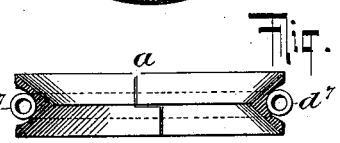
ATTORNEYS

UNITED STATES PATENT OFFICE.

LEOPOLD KATZENSTEIN, OF NEW YORK, N. Y.

METALLIC RING PACKING.

SPECIFICATION forming part of Letters Patent No. 595,811, dated December 21, 1897.

Application filed March 3, 1897. Serial No. 625,830. (No model.)

*To all whom it may concern:*

Be it known that I, LEOPOLD KATZENSTEIN, a resident of the city, county, and State of New York, have invented certain new and useful Improvements in Metallic Ring Packing, of which the following is a specification.

My invention relates to metallic packing, and has for its object to produce a packing adapted for use as a piston and valve rod packing, in situations where high pressures are employed, to take up extra vibrations of the rod and which may be applied to and removed from the rod and stuffing-box without disconnecting the said rod, thereby saving considerable time, labor, and expense.

My invention will be understood by referring to the accompanying drawings, forming part hereof, which show a packing embodying my invention.

Figure 1:
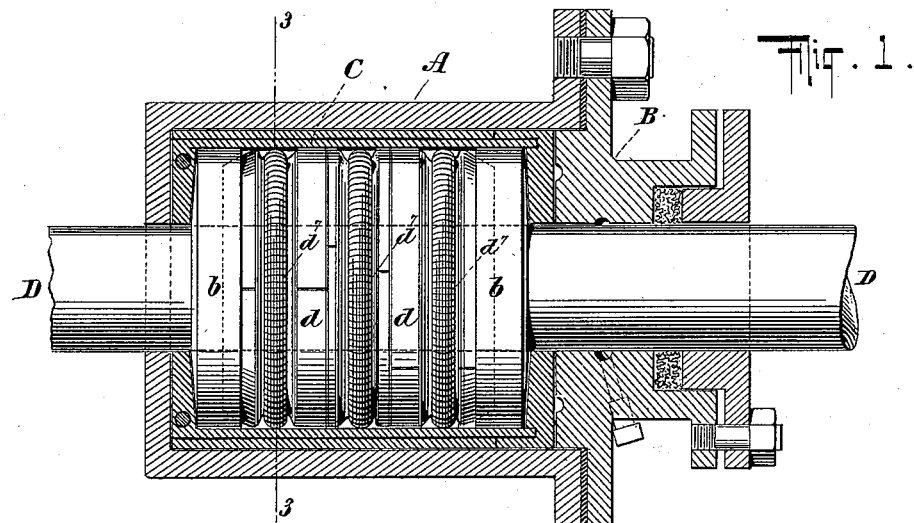
Figure 2:
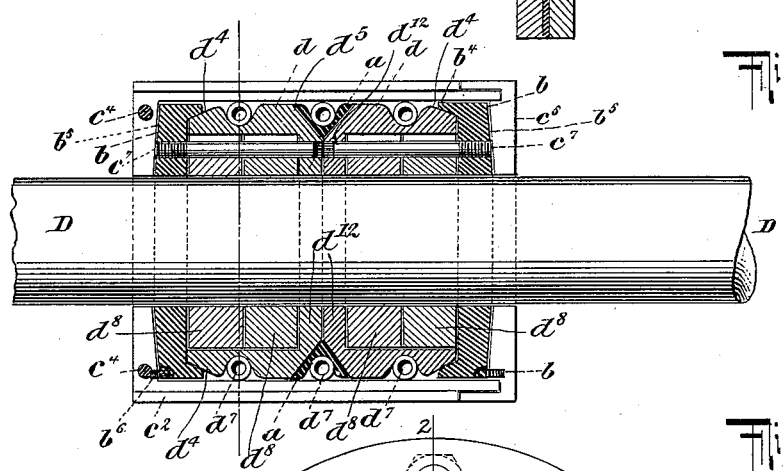
Figure 3:
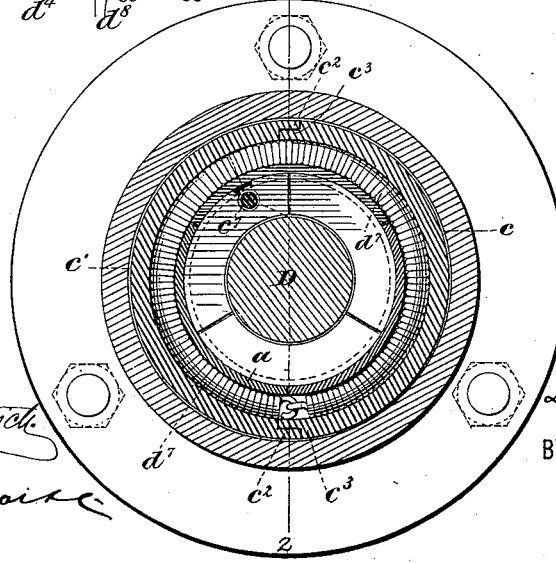

In the drawings, Figure 1 is a side view of the packing with its coöperating casing and stuffing-box in section. Fig. 2 is a section through the packing-rings, showing also the arrangement of the parts of the casing. Fig. 3 is a section on line 3 3 of Fig. 1 and shows also the section-line 2 2 on which the section Fig. 2 is taken. Fig. 4 is a plan view of one of the end rings of the packing. Fig. 5 is a section thereof on line 5 5 of Fig. 4. Fig. 6 is a plan view of one of the intermediate rings of the packing. Fig. 7 is a section on line 7 7 of Fig. 6. Fig. 8 is a plan view of the expansion-ring, and Fig. 9 is a section on line 9 9 of Fig. 8.

In the drawings, A is a suitable stuffing-box provided with the usual gland B. Contained within this stuffing-box is a casing C. This casing comprises two body-sections $c\ c'$, which are of semicircular form and have their edges $c^2\ c^3$ stepped and lapped. One of these sections is provided with pins or screws $c^4\ c^4$. The cap of the casing, which forms part thereof, comprises two semicircular sections $c^5\ c^5$, which fit on the casing-sections $c\ c'$ after the manner of the top of a box. Rings are contained in the casing. In the present instance I have shown these rings as follows: $b\ b$ are the end rings each, as shown in Fig. 4, comprising two parts $b'\ b^2$, one or both of which parts may be pierced or apertured, as with an aperture $b^3$, to receive and hold a pin or pins $c^7$, which passes through the rings of the packing, each of which rings is shown as pierced for the passage of the pin or pins, except the middle or expansion ring $a$, which is of sufficient size to allow the pin to pass therethrough when it is in the position shown in the figures. These rings $b$ have curved faces $b^5$ to allow the packing to vibrate with the rod in the casing and may be held from rotating by pins $b^6$, set in the casing. The intermediate rings $d$ are shown as comprised of three sections $d'\ d^2\ d^3$, which sections are beveled on both edges $d^4\ d^5$ and grooved at $d^6$ to receive a suitable spring $d^7$ and recessed for the reception of sectional rings comprising segments of Babbitt or other soft metal $d^8$. These sections $d^8$ are placed loosely in the ring $d$ in such a manner as to break joints, as clearly shown at $d^9\ d^{10}\ d^{11}$. The rings $d$ are so placed as to break joint with the joints of the rings $b$ and are put together edge to edge with their beveled sections $d^5$ adjacent. Intervening between the rings $d$ is an expansion-ring $a$, which is shown in Fig. 8 as consisting of several sections $a'\ a^2\ a^3$, of triangular form, grooved at the rear for the reception of a spring $a^4$ and fitting in the angular space formed by the bevels $d^4$ between the two rings. This expansion-ring is also placed in such a fashion as to break joints with its adjacent rings $d\ d$, so that from end to end of the packing all the ring-sections break joint with each other to prevent steam from leaking, and a very efficient packing is produced, the pins $c^7$, which, however, may be replaced by a number of similar pins, preventing the rings revolving one upon the other when the piston-rod D reciprocates back and forth through the packing. At the parts of the rings $d$ which are laid together the walls of the rings are prolonged inwardly to form flanges $d^{12}$, in order to more securely hold the ring-sections $d^8$, and the end rings $b$ are flanged at $b^4$ to receive the beveled ends $d^4$ of the rings $d$ and press the same toward the rod.

Having described my invention, what I claim, and desire to secure by Letters Patent, is—

1. In a packing, the combination of sectional end rings $b$, intermediate sectional rings $d$ recessed for the reception of sectional metal pieces $d^8$, the rings $d$ being beveled at each end and recessed peripherally, springs for holding the rings $d$ firmly around the piston-rod, a triangular spring expansion-ring $a$ intervening between the rings $d\ d$ and a pin or pins for holding said rings in alinement, adjacent sectional rings breaking joints with each other from end to end of the packing.

2. In a packing, the combination of inside conical flanged end rings $b$, intermediate sectional rings $d$ recessed for the reception of segmental pieces $d^8$, the said rings $d$ being beveled at one end to enter the flanged end rings $b$ and at the other end to form a triangular groove, a triangular spring expansion-ring $a$ between the rings $d$, means for preventing the rings from turning one on the other, the said rings breaking joints with each other from end to end of the packing.

3. In a packing, the combination of flanged end rings, intermediate sectional spring-rings beveled at one end to enter the flanged end rings and at the other end to form a V-shaped groove, the said intermediate rings being recessed for the reception of segmental pieces $d^8$ and provided with flanges $d^{12}$ and a sectional spring-ring $a$ intervening between the intermediate rings.

LEOPOLD KATZENSTEIN.

Witnesses:
GEO. E. MORSE,
HARRY M. TURK.